United States Patent [19]

Faerber et al.

[11] 4,333,110
[45] Jun. 1, 1982

[54] TELEVISION EDITING SYSTEM

[76] Inventors: Nelson A. Faerber, 900 Sixth Ave., Ste. 101, Naples, Fla. 33940; Edgar L. Bonner, Rte. 4, Box 101B, Taylorsville, N.C. 28681

[21] Appl. No.: 248,984

[22] Filed: Mar. 30, 1981

Related U.S. Application Data

[63] Continuation-in-part of Ser. No. 38,378, May 11, 1979, Pat. No. 4,259,689.

[51] Int. Cl.³ .............................................. H04N 5/48
[52] U.S. Cl. .................................... 358/165; 358/188
[58] Field of Search ............ 358/165, 181, 188, 193.1, 358/93; 455/218, 229, 230, 231, 232, 234

[56] References Cited

U.S. PATENT DOCUMENTS

| | | | |
|---|---|---|---|
| 2,632,800 | 3/1953 | Schlesinger | 455/218 |
| 3,332,021 | 7/1967 | Hedlund | 455/218 |
| 3,337,805 | 8/1967 | Joseph | 455/228 |
| 3,378,775 | 4/1968 | Joseph | 455/231 |
| 3,541,453 | 11/1970 | Vanderpoel | 455/229 |
| 3,619,492 | 11/1971 | Evans | 358/165 |
| 3,843,929 | 10/1974 | Mayle | 455/228 |
| 3,940,701 | 2/1976 | Novitski | 455/352 |
| 3,975,688 | 8/1976 | Kroger | 455/228 |
| 4,047,226 | 9/1977 | Hedges | 358/165 |

OTHER PUBLICATIONS

"Commercial Killer Improves Programs", Radio-Electronics, Jun. 1950, p. 44.
"Commercial Break", p. A18, Washington Post, 3-12-79.

Primary Examiner—Michael A. Masinick
Attorney, Agent, or Firm—Blair, Brown & Kreten

[57] ABSTRACT

A television editing system includes devices which respond to the absence of picture information in a video signal for at least a predetermined period of time, a prelude to the start of a commercial message, and disable or reduce the audio output from a television set or the like for a given period. A microphone is arranged to receive an external audio recall signal, which could be produced by a user clapping his hands. This received signal is processed and used to recall the audio output within the given period. A circuit, responsive to received video signals over a period during which several commercial messages may appear, automatically sets the sensitivity of the editing system.

27 Claims, 5 Drawing Figures

TELEVISION EDITING SYSTEM

CROSS REFERENCE TO RELATED APPLICATIONS

This application is continuation-in-part of application Ser. No. 38,378 filed May 11, 1979, entitled *"Television Advertising Editing System"* which has matured as U.S. Pat. No. 4,259,689 issued on Mar. 31, 1981.

BACKGROUND OF THE INVENTION

A television set has become today a basic ingredient in everyday living and it is rare to find a home today which does not have at least one television set. With this wide audience available to television network companies and the attendant advertising revenue source, the use of commercial messages during the broadcasting of program material is increasing with greater and greater frequency so that a substantial portion of the entertainment program material is being preempted by commercial messages for advertising purposes. While the interruption of such program material for commercial material messages has always been somewhat disturbing to the viewing audience, the increase in preemption of time of the program material for advertising is beginning to bring about a strong adverse reaction by the viewing audience and a disillusionment or dissatisfaction with television in general.

Very little has been done in the past to eliminate the disturbing aspects of commercial messages in television broadcasting since, to the broadcasting network, such a reduction in commercial messages would be accompanied by a loss of advertising revenue. On the other hand, the television viewer with a typical lack of skill in electronic matters can do very little to ameliorate the distasteful aspects of television advertising broadcasting. One such effort in the past, which has met with very little success, has been to use the increased sound volume accompanying a commercial message to trigger a suitable device for shutting off the set or for eliminating the sound. The only recourse left for the typical television viewer is simply to cut off the set or turn down the audio in the set manually or by some type of remote control, such an approach being highly inconvenient and seldom practiced.

SUMMARY OF THE INVENTION

A primary object of the invention is to provide novel system for automatically controlling the audio output of a video apparatus, such as a television set, during presence of commercial messages.

Another object of the invention is to provide a novel automatic television editing system which responds immediately to the absence of picture information in the video signal for at least a given period, for example one frame, as a prelude to the presentation of a commercial message, on a video apparatus, such as a television set either to disconnect or to diminish the audio output of the set during the commercial message.

A further object of the invention is to provide a novel television editing system which may be easily attached to a convential commercially available television set for diminishing or dicontinuing the audio output of the set upon the absence of picture information for a given period, for example one frame, a prelude to commercial messages, which is simple and inexpensive in construction and which utilizes a minimum of readily available commercial parts.

A still further object of the invention is to provide novel television editing system in which the video signal in the set is utilized to interrupt the audio output from the set during a commercial message and which may be applied easily to both color and black and white television sets.

An additional object of the present invention is to provide a novel system for automatically controlling the audio output of a video apparatus, such as a television set during the presence of commercial messages, which allows a user to over ride the control and restore the audio output at will.

A still additional object of the present invention is to provide a novel system for automatically controlling the audio output of a video apparatus, such as a television set, during the presence of commercial messages, which automatically adjusts the sensitivity of the system.

The objects of the invention and other related objects are accomplished by the provision of control means, for example a relay, for controlling the audio output of a video apparatus, such as a television set, and video signal detecting means connected to the apparatus for receiving the video signal in the apparatus together with means connected to the detecting means for monitoring the video signal received by the detecting means to provide an output voltage signal which indicates the absence of picture information in the video signal during the interval between the program material and commercial material, and which also includes over ride means which restores the audio functions and/or automatically adjusts the sensitivity of the system. Voltage responsive means are connected to the control means which respond to the output voltage signal indicating the absence of picture information in the video signal. The voltage responsive means being adapted to actuate the relay means and either diminish or discontinue the audio output for a predetermined period of time.

BRIEF DESCRIPTION OF THE DRAWINGS

The objects stated above and other related objects and advantages of the invention will become apparent from the following description taken in connection with the accompanying drawings in which.

DESCRIPTION OF THE PREFERRED EMBODIMENTS

Figure 1:
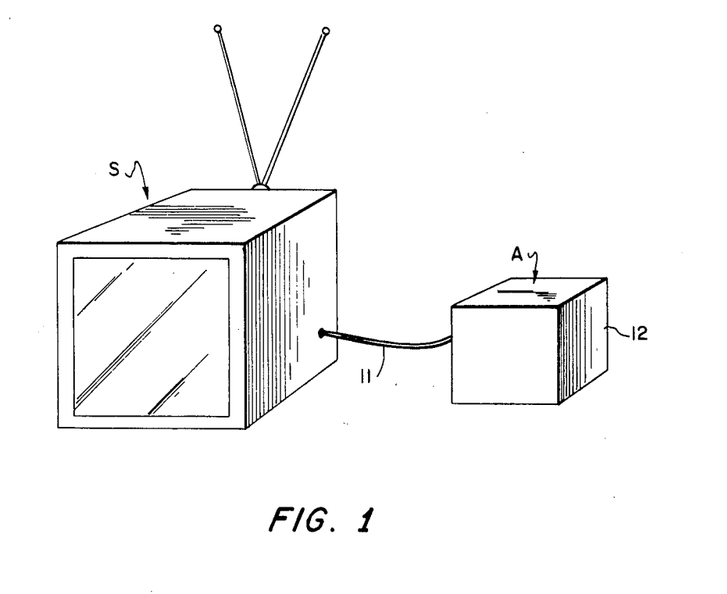
FIG. 1 is a perspective view showing the advertising editing system in connection with a television set of conventional construction.

Referring now to FIG. 1, there is shown a typical commercially available television set designated generally by the letter S which is arranged to be connected by means of conductors 11 to a unit designated generally by the letter A which is constructed in accordance with the invention. The unit A comprising the television advertising editing system of the invention is preferably enclosed in a suitable housing 12 and is arranged to be connected by means of the conductors 11 to that part of the circuit of the television set S at which the video signal from a broadcasting station appears. The television set S may be either of the black/white or color type and the connection by the conductors 11 may be readily made to either the cathodes or the grids of the CRT of the set S, depending on where the video signal is applied to the CRT tube of the set, of course, the video signal may be obtained from an number of points within the television set S.

Figure 2:
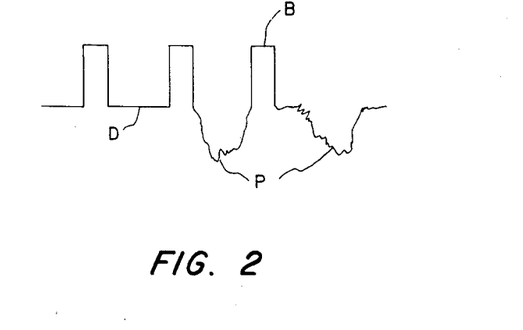
FIG. 2 is a diagram showing the wave shape of a typical video signal and the interruption between video signals for commercial messages used in the operation of the system of FIG. 1 and the present invention.

Referring now to FIG. 2, there is shown a typical video signal including picture information designated by the letter P. As is well known, just prior to the beginning of a commercial message, the video signal picture information P is interrupted for a brief moment, for example starting at a point in time indicated by a blanking pulse B, during which period of time the video goes dark as indicated at D. This period of time during which picture information P goes dark is about 0.3 seconds or somewhat greater and it is this interruption in the video picture information P which is utilized in the operation of the advertising editing system of the invention as will be explained hereinafter. It has been found that nearly every commercial message in television broadcasting is preceded by this brief period when the video picture information goes dark. The video signal shown in FIG. 2 is particularly for a black/white television set which has the video signal drive applied to the cathode of the CRT. However, it should be understood, that the principle of operation of the invention is the same whether the television set is a color set or a black/white set and whether the video signal was applied to the cathodes or the grids of the CRT. The presence of picture information P is indicated by an increase in the peak negative amplitude of the video signal as shown in FIG. 2. It should be understood that in television sets where the video signal is applied to the grid or grids of the CRT, the polarity of the input is reversed.

Figure 3:
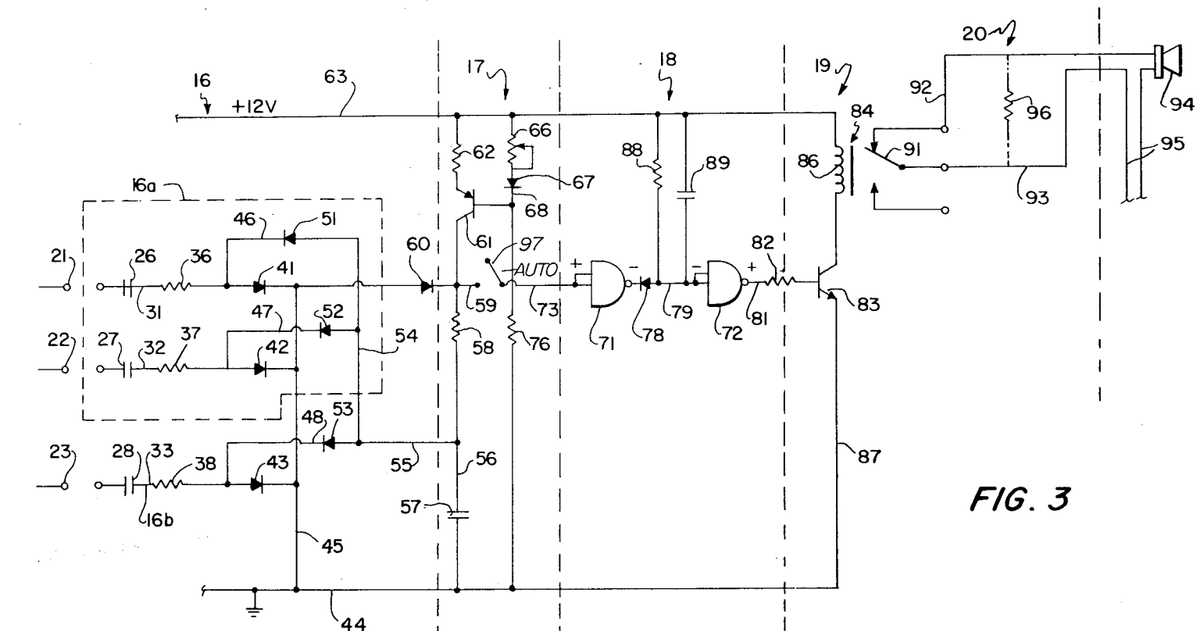
FIG. 3 is a modified schematic diagram of the circuit incorporated in the advertising editing system disclosed in applicants' application Ser. No. 38,378 which has matured as U.S. Pat. No. 4,259,689.

Referring now to FIG. 3, there is shown a circuit which forms an advertising editing system as disclosed which includes video signal detecting means designated generally by the numeral 16, means for monitoring the video signal received by the detecting means designated generally by the numeral 17, voltage responsive means connected to the video signal monitoring means 17 and designated generally by the numeral 19 connected to the voltage responsive means 18 and to the audio output system of the television set designated generally by the numeral 20.

As shown in FIG. 3, a portion of the video signal detecting means enclosed in broken lines and designated 16a is utilized together with the other components of the detecting means 16 for color sets which as well known, utilizes three electron guns. However, the principle of operation is the same whether the circuit of FIG. 3 is utilized for either a black/white set or a color set. The portion 16b only is used for a black/white set.

In the description to follow, the video signal detecting means 16 will be described in relation to a color television set utilizing both portions 16a and 16b.

The video signal detecting means 16 in the circuit of FIG. 1 is connected to three terminals 21 through 23 in the television set in the well known manner at which the video signal appears in a color set and the video signal is coupled to the detecting means 16 by capacitors 26, 27, 28 in conductors 31, 32 33 respectively. As explained above, the connection to conductor terminals 21, 22, 23 is to the cathodes or grids of the television set depending on where the video signal is applied to the CRT and there are three connections for a color television set and one for a black/white set. The video signals are isolated from the DC voltage in the video signal by the capacitors 26, 27, 28 and resistors 36, 37, 38 are provided in the conductors 31, 32, 33 for isolating the detecting means 16 and to prevent loading of the video signal circuits in the receiving set S. From the resistors 36, 37, 38 the conductors 31, 32, 33 are connected to the anodes of diodes 41, 42, 43 respectively the cathodes of which are connected to ground 44 by a common conductor 45. The diodes 41, 42, 43 clamp the positive cycle of the video signal to the ground and thus form a negative reference voltage on the capacitors 26, 27, 28 respectively.

The conductors 31, 32, 33 are also connected between resistors 36, 37, 38 and diodes 41, 42, 43 through conductors 46, 47, 48 to the cathodes to diodes 51, 52, 53 respectively the anodes of which are connected together by a conductor 54 connected in turn by conductor 55 to conductor 56.

Conductor 56 is connected to one side of a control capacitor 57 in the monitoring means 17, the other side of capacitor 57 being connected to ground 44. Conductor 56 is also connected to one side of a resistor 58, the other side of which is connected to conductor 59 to which the cathode of a diode 60 is connected. The anode of diode 60 is connected to the common conductor 45 and the junction point of conductors 56 and 59 is connected to the collector of a transistor 61 having its emitter connected through a resistor 62 to a source of positive DC voltage preferably, 12 volts DC by conductor 63. Thus, capacitor 57 is negatively charged by the DC voltage on conductor 56 and if the negative cycles of the video signal exceed the negative charge already on capacitor 57, diodes 51, 52, 53 conduct. When diodes 51, 52, 53 conduct, the result is a net negative charge on control capacitor 57 which varies with the amplitude of the video signal. Control capacitor 57 is discharged through resistor 58 and transistor 61 via switch 97, a single-pole, double-throw switch. The switch 97 can be moved to the position marked AUTO, disconnecting the transistor 61 and connecting the circuit to the output from the circuit of FIG. 5 thereby effecting an automatically adjusting of the sensitivity of the circuit of FIG. 3.

Transistor 61 is a constant current source having an output passing through resistor 58 to discharge capacitor 57. As current through resistor 58 is constant, the voltage across resistor 58 is constant. Therefore, changes in the voltage across control capacitor 57 appear at the collector of transistor 61 as long as transistor 61 is not saturated and as long as diode 60 does not conduct. A potentiometer 66 is provided in the circuit of FIG. 3, one side of which is connected to the positive power supply conductor 63 and the other side to the anode of a diode 67. The cathode of diode 67 is connected by means of conductor 68 to the base of transistor 61. Therefore, potentiometer 66 serves as a sensitivity control by setting a predetermined tripping voltage across control capacitor 57.

The voltage responsive means 18 of the invention which is connected to the monitoring means 17 include at least one and preferably two control gates 71, 72 which are preferably Schmitt trigger gates. Gate 71 serves as a threshold detector and has an input connected by means of conductor 73 to conductor 56 at the junction of transistor 61, diode 60 and resistor 58. It is the setting on the potentiometer 66 which determines the voltage across control capacitor 57 which will trip the Schmitt trigger gate 71. It can be seen that the cathode of diode 67 connected to the potentiometer 66 is connected by conductor 68 through resistor 76 to ground 44.

In the circuit of FIG. 3, the Schmitt trigger gate 71 serves as a threshold detector such that when the picture information in the video signal disappears at least for a given period, for example for at least one frame as explained above, control capacitor 57 charges positive so that the input on conductor 73 to gate 71 goes positive to output a negative signal. The output of gate 71 is connected to the cathode of a diode 78, the anode of which is connected by conductor 79 to the input of the second control gate 72 also preferably the Schmitt trigger gate. The output of gate 72 is connected by conductor 81 through resistor 82 to the base of a control transistor 83 in the relay means 19. The relay means 19 includes a relay 84 having a coil 86 connected at one side to the collector of transistor 83, the emitter of which is connected by conductor 87 to ground at 44. The other side of relay coil 86 is connected to the positive power supply conductor 63.

Conductor 79 between the gates 71, 72 is connected through a resistor 88 to the positive power supply conductor 63 and through a capacitor 89 to the power conductor 63 also.

As explained above, when control capacitor 57 is charged positive by the disappearance of the video signal, the input to control gate 71 goes positive and the output of control gate 71 goes negative. When the output of control gate 71 is driven negative, diode 78 conducts to ground and charges capacitor 89 so that the input to gate 72 goes negative. When the input of gate 72 is negative, the output is positive to fire transistor 83 so that transistor 83 conducts and current flows through the relay coil 86. Relay 84 includes a double-pole, single-throw switch 91 which in the deenergized condition of the coil 86 moves into the solid line position of FIG. 3 to complete a circuit through conductors 92 and 93 to the audio output speaker 94 of the television set S connected in the well known manner by conductors 95 to the internal audio amplifier. When transistor 83 conducts, relay coil 86 is energized and the switch 91 moves from the solid line to the dotted line position disconnecting the speaker 94 and eliminating the audio from the television set. If a diminished sound level is desired, a resistor 96 is connected across conductors 92, 93, so that when the relay 84 is actuated the audio from speaker 94 is diminished rather than discontinued.

Transistor 83 will continue to conduct as long as the input to gate 72 is below the threshold level. The time during which the input of control gate 72 remains below the threshold level is determined by the discharge of capacitor 89 through resistor 88 and preferably this time is set to about 35 to 40 seconds. Capacitor 89 is recharged if during this time, the detecting means 16 detects another interruption in the picture information. Otherwise, the circuit of the invention deactivates the relay 84 and releases the audio control at the end of the time period.

Figure 4:
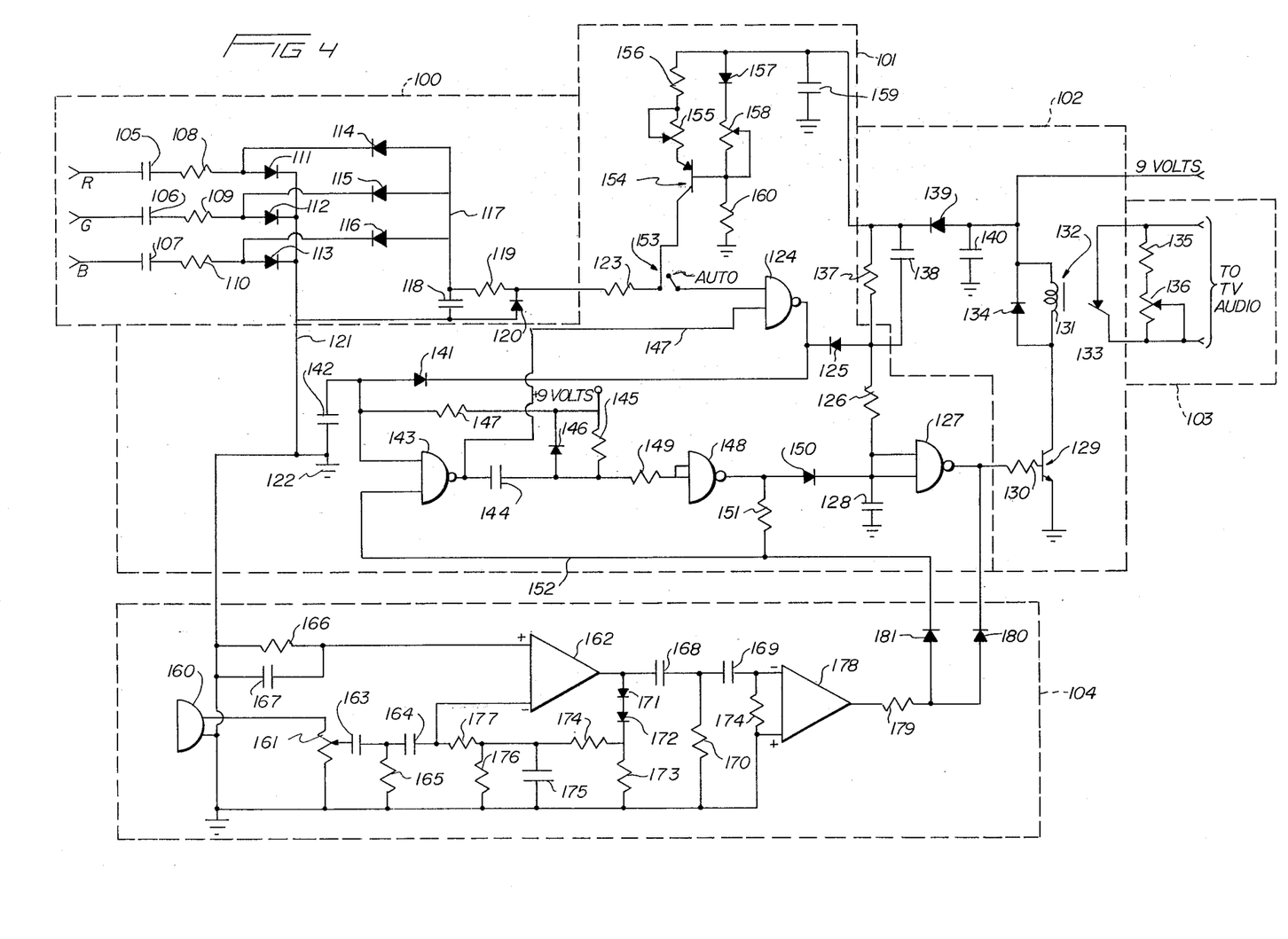
FIG. 4 is a schematic diagram of a circuit for effecting the restoration of the audio signal in a television advertising editing system in accordance with the present invention.

Referring now to FIG. 4, there is shown a circuit which forms an advertising editing system operatively combined with an audio recall circuit in accordance with one aspect of the present invention. The editing system includes video signal detecting means generally designated by the numeral 100, means for monitoring the video signal received by the detecting means for and processing the received signal designated generally by the numeral 101, voltage responsive means coupled to the video signal monitoring and signal processing means 101 and generally designated by the numeral 102 operatively arranged to control the audio output system of a TV audio circuit 103. The system also includes a audio recall circuit generally designated by the numeral 104.

As illustrated in FIG. 4, the invention is shown in operative association with red, green and blue video signal input lines designated generally R, G and B respectively. It is to be appreciated nevertheless that the invention is not solely related to association with color television receivers or the like, but can function equally well with black and white television receivers similarly to the circuit illustrated in FIG. 3. The input video signals from the three lines are fed through respective coupling capacitors 105–107, via respective resistors 108–110 to the anodes of respective diodes 111–113 and to the cathodes of respective diodes 114–116. The anodes of respective diodes 114–116 are connected to a common line 117 which is directly connected to one plate of a control capacitor 118. A resistor 119 and a diode 120 connected in series with one another are connected across the capacitor 118, the anode of the diode 120 and one plate of the capacitor 118 being connected to ground 122 via a lead 121. The cathodes of the diodes 111–113 are also connected to ground, these diodes serving as clamps. The capacitor 118 becomes negatively charged in substantially direct proportion to the magnitude of the video signal being received at any given time. A resistor 123 is connected between the junction of the diode 120 and the resistor 119 and a first input terminal of a NAND gate 124. The output of a NAND gate 124 is connected, by a diode and 125 and a resistor 126 to the input terminal of a inverter 127, which preferably is realized as a Schmitt trigger circuit. The input terminal of the inverter 127 is connected to ground, by a capacitor 128.

The output terminal of the inverter 127 is connected to the base of a grounded-emitter transistor 129, by a resistor 130. The collector of the transistor 129 is connected in series with the relay winding 131 of a relay generally designated by the numeral 132 to a source of +9 volts. The relay 132 is provided with a pair of contacts 133 which are in series with the audio circuit of the TV set S (FIG. 1). When the contacts 133 are closed, the resistor 135 and the rheostat 136 which are connected in series across the contacts are shorted out and the audio signal from the TV set S is at full strength. When the contacts 133 are opened, the audio output circuit of the TV set S is in series with the resistor 135 and rheostat 136 which serve to reduce the volume of the audio. The rheostat 136 functions to set the minimum value of the audio. Of course, the resistor 135 and rheostat 136 can be eliminated, in this instance the audio from the television set S would be completely cut off when the relay contacts 133 are open. A diode 134 is connected across the relay winding 131.

The anode of the diode 125 is connected, via a parallel RC circuit consisting of a resistor 137 and a capacitor 138 to a cathode of a diode 139 which has its anode connected to ground via a capacitor 140. The anode of the diode 139 is also connected to the junction between one end of the relay winding 131 and the cathode of the diode 134. The RC circuit consisting of resistor 137 and capacitor 138 provide a delay time constant for holding the relay 132 on for a predetermined length of time, this time being the time usually devoted conventionally to given individual television commercial messages. The actual time may vary from place to place and could be for example 30 seconds or 60 seconds, somewhat more or less or even 10 seconds.

The output terminal of the NAND gate 124 is also connected via diode 141 to an ungrounded plate of a capacitor 142 which has its other plate connected to ground. The anode of the diode 141 is also connected to one input terminal of a NAND circuit 143 which has its output terminal connected to the second input terminal of the NAND gate 124. The output terminal of the NAND circuit 143 is connected, by a capacitor 144 to one end of a resistor 145 and to the anode diode 146. The cathode of the diode 146 and the other end of the resistor 145 are connected together and to the first input terminal of the NAND circuit 143, via a resistor 147. The junction between the anode of the diode 146 and the resistor 145 is connected to the input of an inverter 148 via a resistor 149. The inverter 148, like the inverter 127 is preferably developed as a Schmitt trigger. The output terminal of the inverter 148 is also connected to the second input terminal of the NAND gate 143, via a resistor 151 and a conductor 152.

Figure 5:
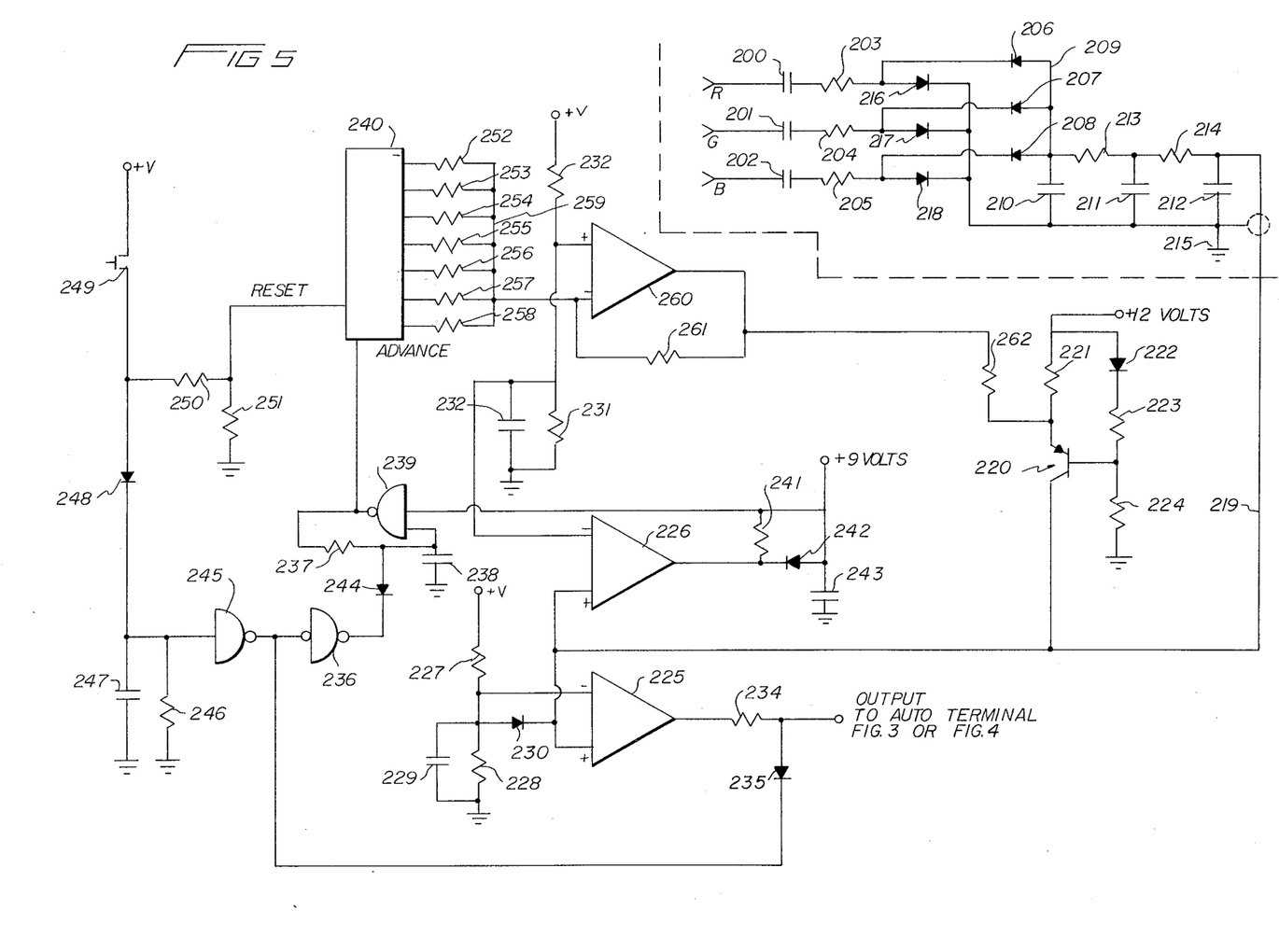
FIG. 5 is a schematic diagram of a circuit for effecting the automatic adjustment of sensitivity in a television advertising system in accordance with the present invention which can be used in conjunction with the circuits of FIGS. 2 and 3.

A single-pole double throw switch 153 is shown at a junction between the first input terminal of the NAND circuit 124 and the resistor 123. As shown, the switch is connected to a terminal designated AUTO. It is to this terminal that the adjustable constant current circuit of FIG. 5 is to have its output connected, in accordance with one aspect of the present invention that will be dealt with in more detail below. In its other position, the switch 153 is connected to the collector of a transistor 154 which forms part of a manually adjustable constant current circuit which can be used to manually set the sensitivity of the commercial-editing portion of the circuits. The constant current generator is very similar to the one utilizes in the circuit of FIG. 3 and because it does not form a part of the present invention, it does not appear to be necessary to discuss its operation in detail. The circuit components associated with the transistor 154 to form the constant current circuit include a rheostat 155, a resistor 156, a diode 157, a second rheostat 158, a second resistor 160 and a capacitor 159 connected as shown in FIG. 4.

Before proceeding with a detailed discussion of the audio recall circuit 104 and its association with the other components, a few brief remarks appear to be in order. The purpose of the audio recall function is to enable a user to restore the sound disabling the editing function of the circuit, whenever the user wishes to hear the otherwise preempted audio portion of a commercial message or becomes aware the the fact that the circuit has inadvertantly responded incorrectly and is preempting the audio of the entertainment portion of a television program.

The audio recall circuit 104 functions in response to a sharp sound, such as tapping a table top or the clapping of a user's hands. It only functions during the period when the sound portion of a TV signal has been cut off, following the sensing of the precursing absence of picture information in the video which preceeds a commercial message. During this period a sharp sound will enable the audio recall circuit 104 to restore the sound portion of the program and at the same time disabling the editing function for a short period of time.

Returning to FIG. 4, the audio recall circuit 104 includes a microphone 160 which is connected across a volume control potentiometer 161. The output of the potentiometer 161 connected to the inverting terminal of an operational amplifier 162 via a high pass filter. The high pass filter as illustrated, includes first and second capacitors 163, 164 connected in series with their commonly connected plates connected to ground via a resistor 165. The noninverting input terminal of the operational amplifier 162 is connected to ground via an RC circuit consisting of parallel connected resistor 166 and capacitor 167, as is one terminal of the microphone 160. The sharp signal picked up by the microphone 160 is passed through the high pass filter 163, 164, 165, is amplified by the amplifier 162 and is passed through a second high pass filter consisting of series connected capacitors 168, 169 and resistor 170, these components being connected similarly to the first-mentioned high pass filter. The amplifier 162 is biased into linear operation by a biased feedback network which consists of series connected diodes 171, 172 resistors 173, and 174, capacitor 175, and resistors 176 and 177 connected as shown, with the free end of resistor 177 being connected to the inverting input terminal of the operational amplifier 162. In this arrangement the signal is amplified by the open loop gain of the amplifier 162. Resistor 174 and capacitor 175 form a low pass filter so that D.C. bias is stable and the A.C. gain is very high.

The output of the second high pass filter, is fed to the inverting input terminal a second operational amplifier 178, a resistor 179 being connected between the input terminals of the operational amplifier 178. The noninverting terminal of the amplifier 178 is connected to ground. The second operational amplifier 178 does not operate in a linear mode. With the noninverting input at ground, the inverting input bias current passes through resistor 179, causing a slightly positive bias to appear at the inverting input which is also the signal input. With no signal input present, the output of the amplifier 178 is held negative. The signal input must exceed the bias level in order for the output to respond. Thus, the amplifier 178 functions as a high gain threshold detector. When the input signal exceeds a bias voltage, the result is a positive voltage swing at the output terminal of the amplifier 178. The output terminal of the amplifier 178 is connected, via a resistor 179 to the anodes of diodes 180 and 181. The cathode of the diode 181 is connected to the output terminal of the inverter 127. The output terminal of the diode 181 is connected to the second input terminal of the NAND gate 143.

When the picture information in the television video signal appearing on the lines R, G and B goes blank, a prelude of the transmission of a commercial message, the upper input terminal of the NAND gate 124 goes positive and its output terminal goes negative. The negative signal from the NAND gate 124 discharges the capacitor 138, via the diode 125, causing the input at the terminal of the inverter 127 to go negative. The output of the inverter 127 goes positive, turning on the transistor 129 thereby energizing the relay 132. The time constant of the resistor 137 and the capacitor 138 is such to cause the relay winding 132 to remain energized for a predetermined length of time, usually the conventional time for ordinary single television commercial messages. Subsequent to this particular time negative pulses from NAND gate 124 continue to reset the timer to the beginning. Thus in normal operation the relay 132 remains energized for at least a predetermined time determined by the resistor 137 and capacitor 138 following the last time the picture information disappears from the video signal. Accordingly, if several commercials appear in subsequential order with the initial blanking signal being present, the relay 132 will remain on for a considerable length of time. When the relay 132 is turned on because of the current flowing in its winding 131, its contacts 133 open thereby either cutting off sound from the TV set S (FIG. 1) audio circuit or, in the case where the resistor 135 and rheostat 136 are present, reducing the sound to a considerable degree.

Prior to the system being tripped by the disappearance of picture information from the video signals as a prelude to the appearance of a commercial message, the output of the operational amplifier 178 is clamped to a negative potential by diode 180, preventing the audio recall circuit from effecting the system until the output from the inverter 127 goes positive. When the timer has been triggered the output from the amplifier 178 is no longer clamped negative and when a recall signal is received by the microphone 160 and thereafter a positive pulse is generated at the second input terminal of the NAND circuit 143. This causes the output from the NAND circuit 143 to go negative and the output from the inverter 148 to go positive. The positive output from the inverter 148 is returned to the second input terminal of the NAND circuit 143 via the resistor 151 and the recall timer latches on until the capacitor 144 charges positive via the resistor 145 to the threshold level appears at the input to the inverter 148.

The output of the recall timer from the output terminal of the inverter 148 clamps the input terminal of the inverter 127 positive via the diode 150. This disables the relay 132 drive network, and serves to recharge capacitor 148 via the resistor 126. The output terminal of the NAND gate 143 is negative during the recall time and disables the NAND gate 124 because of its connection via the line 147 which extends between the output of the NAND gate 143 and one of the inputs of the NAND gate 124. This prevents the audio recall function to be effected until the recall time has passed.

The resistor 147, the diode 141 and the capacitor 142 form a network which disables the recall timer for a fraction of a second in the initial action of the editor in effecting the removal or reduction of audio signals from the television set S (FIG. 1). During this period the sound of the relay activating timer or the relay contacts 133 would at least in some instances constitute interference which would be picked up by the microphone 160 and inadvertantly override the editing function. The capacitor 142 is discharged via the diode 141 when the output of the sensor goes negative and trips the editor timer. The capacitor 142 must be charged via the resistor 147 to the threshold of the input terminal of the NAND gate 143 before the recall timer can be energized.

Referring now to FIG. 5, the schematic diagram of a circuit for effecting the automatic adjustment of sensitivity in a television advertising editing system which can be used effectively in conjunction with television advertising editing system shown in FIG. 3 and the system shown in FIG. 4, in accordance with a second aspect of the invention. In each of these instances the output from the circuit of FIG. 5 is connected to the terminal labled AUTO in FIG. 3 or FIG. 4, this terminal being associated respectively with a single pole double-throw switch 97 or 153, respectively.

As shown in FIG. 5 the video input signals from the red, green and blue signal circuits of a television set S (FIG. 1) are supplied via lines labled respectively R, G and B. Coupling capacitors 200-202 respectively coupled the red, green and blue signals via respective resistors 203-205 to the cathodes of respective diodes 206-208 which have their anodes connected to a common buss 209 and to one plate of capacitor 210 which has its other plate connected to ground 215. The common buss 209 is connected via a filter to output line 219. The filter includes a capacitor 211 connected between the junctions of resistors 213 and 214 and ground 215 and a third capacitor 212 connected between the output line 219 and ground 215. The ends of the resistors 203-205 which are connected to the diodes 206-208 are also respectively connected to the anodes of diodes 216-218 which have their respective cathodes commonly connected to the ground 215.

The output line 219 is connected to the collector of the transistor 220 which has its emitter connected to a +12 volt buss via a resistor 221. The base of the transistor 220 is biased by a voltage dividing network consisting of a diode 222, resistor 223 and resistor 224 connected in series between the +12 volt buss and ground. The base of the transistor 220 is connected to the junction between the resistor 223 and 224. The voltage on the output line 219 is also directly connected to the noninverting input terminals of differential amplifiers 225 and 226 which amplifiers are respectively the active elements of a first threshold detector and a second threshold detector. The inverting terminal of the differential amplifier 225 is connected to a voltage divider consisting of series connected resistors 227 and 228 connected between a source of positive potential and ground, a capacitor 229 being connected across a resistor 228 and the junction between the resistors 227 and 228 being connected directly to the negative input terminal. The noninverting input terminal of the differential amplifier 225 is connected via a diode 230 to the same junction between the resistors 227 and 228 as the inverting input terminal of the differential amplifier 225. The inverting input terminal of the differential amplifier 226 is connected to ground via a parallel RC circuit consisting of a resistor 231 and a capacitor 232, the free end of the resistor 231 being connected in series with a resistor 232 to a point of positive reference potential.

The output terminal of the differential amplifier 225 is connected by a resistor 234 to the output connection by the circuit of FIG. 5, which connection is made to the point marked AUTO in either the circuit of FIG. 3 or that of FIG. 4. This output terminal of the circuit of FIG. 5 is also connected, via a diode 235 to a negated input terminal of inverter 236, which the output of, is connected via the diode 244 to junction between a resistor 237 and a capacitor 238 which has its other plate connected to ground. The ungrounded plate of the capacitor 238 is connected to a first input of a NAND gate 239 which has its output terminal connected to the free end of the resistor 237 and to the advance terminal of a counter 240. The second input terminal of the NAND gate 239 is connected via a resistor 241, having a parallel connected diode 242 connected thereacross to the output terminal of the differential amplifier 226 which forms part of the second threshold detector. The junction between the resistor 241 and the diode 242 is connected to ground by a capacitor 243, inverter 236 has its input terminal, in addition to being connected to the output terminal of the entire circuit via the diode 235, connected to the output terminal of an inverter 245 which has its input terminal connected to ground via parallel of connected resistor 246 and capacitor 247. The junction of the capacitor 247 and resistor 246 which is connected to the input of the inverter 245 is directly connected to a point of positive voltage via a series connected diode 248 and pushbutton switch 249.

The junction between the diode 248 and the pushbutton switch 249 is connected to ground via the series connection of a resistor 250 and 251, the junction between the resistors 250 and 251 being connected to the reset input terminal of the counter 240. The counter 240 is provided with seven output lines in which respective resistors 252–258 appear. The resistors 252–258 are of increasing value, each one being approximately twice the size of its immediately preceeding numbered resistor. The free ends of the resistors 252–258 connected to a common line 259 which is connected to the negative input terminal of a differential amplifier 260, which has its noninverting input terminal connected to the junction between the resistors 233 and 231. The output terminal of the differential amplifier 260 is connected, via a resistor 261 to its inverting input terminal. The output terminal of the differential amplifier 260 is also connected, via a resistor 262 to the emitter of the transistor 220. The differential amplifier 260, connected as shown, functions as a digital-two-analog-converter.

If one desires to operate the circuit of FIG. 3 in conjunction with the circuits of FIG. 5, the single-pole double throw switch 97, shown in FIG. 3, would be moved to the position marked AUTO; in this position the output from the circuit of FIG. 5 would be supplied to the input to the inverter 71. Similarly, were the circuit of FIG. 5 to be used in conjunction with the circuit of FIG. 4, the output from the circuit of FIG. 5 would be connected to the terminal marked AUTO of the single-pole-double-throw switch 153; in this position the output from the circuit of FIG. 5 would be supplied to one input of the NAND circuit 124 so as to automatically adjust the sensitivity of the circuit of FIG. 4 in relationship to the level of video signal available in the television set S (FIG. 1).

It is to be understood that the circuit of FIG. 4 and the circuit of FIG. 3 can function without using the circuit of FIG. 5, provided that the single-pole double-throw switch 97 (FIG. 3) or 153 (FIG. 4) is connected to the collector of transistor 61 or transistor 154 respectively.

The sensitivity adjustment is accomplished automatically using the circuit of FIG. 5. This adjustment is, as in the manual mode, accomplished by adjusting the output of a constant current generator, the adjustment is effected however without any specific action by the user, as will become clear below.

When the black signals, indicating the absence of picture information in the video signals, appear on the input lines R, G and B, a positive voltage appears on the line 219 and the collector of the transistor 220 goes positive. The noninverting input terminal of the differential amplifier 225, which functions as a first threshold detector, is biased slightly positive by the network constituted by the resistor 228 and the capacitor 229. Whenever the input voltage exceeds the bias voltage, an output appears on the output terminal which is connected to the AUTO terminal of either FIG. 3 or FIG. 4. The second differential amplifier 226, which is the active part of the second threshold detector, is biased at about 50% of the supply voltage by its associated dividing network. When the input voltage trips the differential amplifier 226, the output thereof turns on the oscillator which includes the NAND circuit 239. This in turn begins to advance the counter 240 from its initial reset condition, all ZERO output signals. Resistor network 252–258 in operative conjunction with the differential amplifier 260 form a digital-to-analog converter and the output advances from a positive voltage to a lower voltage as the counter advances from all ZEROS toward all ONES. The output from the differential amplifier 260 is applied to the emitter of the transistor 220, via the resistor 262. As the counter 260 advances the output of the constant generator decreases. This output, of the digital-to-analog converter decreases the sensitivity of the system and continues to decrease it, until the input voltage to the differential amplifiers 225 and 226, that is the two threshold detectors is not sufficient to trip the second threshold detector and the oscillator stops.

As a result, the differential amplifier 225, that is the first threshold detector, will trip during blank spots preceeding the inclusion of commercial messages in the television video signal appearing on the lines R, G and B; however, the differential amplifier 226, that is the second threshold detector will not trip because the first threshold detector which includes the differential amplifier 225 trips and the counter 240 will advance and decrease the sensitivity of the system even further.

When the recalibrate, pushbutton switch 249 is activated, it sets the counter 240 to all ZEROS and activates the timer via the resistor 246, the capacitor 247 and the inverter 245. This timer clamps the output of the converter 245 and prevents activation of the editing function of the circuits of FIG. 3 or FIG. 4 until the unit has had time to recalibrate the sensitivity (about 20 minutes). Recalibration is actually completed within the time in which three or four commercial pauses are sensed in the incoming video signal, these pauses being the precursor of the appearance of a commercial message. The timer is made to function long enough to assure that at least one group of commercials occur during the normal course of programming whenever the television set S (FIG. 1) is initially turned on or the recalibrate switch 249 activated. When the recalibrate time expires, then the oscillator which includes the NAND circuit 239 is clamped via the diode 244 sets at the counter 240 so that it can not be caused to advance further. Thus the sensitivity information is stored in the counter 240, until the power is removed or the recalibrate switch 49 activated. In this manner it is not necessary manually to recalibrate the system whenever the TV set S (FIG. 1) is turned off and on or when channels are changed or when signal conditions of a currently received television signal are changed.

The resistor 237 and capacitor 238 set the frequency of the oscillator which includes the NAND circuit 239. Feedback resistor 261 sets the voltage gain of the digital-to-analog converter. The resistors 232 and 231, which constitute a voltage divider, set the bias level for the digital-to-analog converter and the second differential amplifier 226, which forms the active part of the second threshold detector. The diode 230 functions to clamp the input voltage to the differential amplifiers 225 and 226 to prevent this voltage from going more negative than ground.

It to be appreciated that the foregoing description and accompanying illustrations have been set out by way of example, not by way of limitations. Numerous other embodiments and variants are possible without departing from the spirit and scope of the invention, its scope being defined in the appended claims.

What is claimed is:

1. A television editing system comprising, in combination, control means for controlling the audio output of a video apparatus, video signal detecting means, means for coupling said video signal detecting means to a video circuit of said video apparatus for receiving the video signal in said video apparatus, monitoring means coupled to said video signal detecting means for monitoring the video signal received by said video signal detecting means to provide an output voltage signal indicating absence of picture information in the video signal at least for a predetermined period of time during the interval between program material and commercial material, responsive means coupled between said control means and said monitoring means for responding to the output voltage signal to actuate said control means for controlling the audio output of said video apparatus, and means coupled to said control means and responsive to an external recall signal for deactuating said control means upon receipt of the external signal.

2. A television editing system according to claim 1, wherein said video apparatus is a television receiver.

3. A television editing system according to claim 1 or 2, including timing means coupled to said responsive means for maintaining the actuation of said control means by said responsive means for a predetermined period of time.

4. A television editing system according to claim 1 or 2, wherein said control means is adapted to discontinue said audio output.

5. A television editing system in accordance with claim 1 or 2, wherein said control means is adapted to diminish said audio output.

6. A television editing system according to claim 1 or 2, wherein said control means is a relay having contacts in an audio circuit of said video apparatus.

7. A television editing system according to claim 1 or 2, wherein said monitoring means includes a control capacitor connected to an associated source of DC power and means for charging said capacitor with the video signal from said video signal detector means whereby the charge on said capacitor varies with the amplitude of the video signal, said responsive means being arranged to respond to the charge on said control capacitor corresponding to the absence of picture information in the video signal from said video signal detector means to actuate said control means.

8. A television editing system according to claim 7, including means for adjusting the voltage level across said control capacitor to select an output voltage signal level at which said responsive means will respond.

9. A television editing system according to claim 7, wherein said responsive means include a pair of control gates, means for connecting the input of one of said control gates to said monitoring means, means for connecting the output of said one control gate to the input of the other of said control gates, and means for connecting the output of said other control gate to said control means.

10. A television editing system according to claim 9, wherein said control gates comprises Schmitt trigger gates.

11. A television editing system according to claim 9, wherein said means for connecting the output of said one control gate to the input of said other control gate include a diode and wherein timing means are connected between said connecting means for said control gates and said associated source of DC power.

12. A television editing system according to claim 11, wherein said timing means comprises a resistor and a capacitor connected in parallel between said control gates connecting means and said associated source of DC power.

13. A television editing system according to claim 1 or 2, wherein said means for deactuating said control means includes a microphone, the external recall signal being a sound signal.

14. A television editing system according to claim 1 or 2, including automatic means responsive to video signals in said video apparatus for automatically adjusting sensitivity of the system.

15. A television editing system comprising in combination, control means for controlling the audio output of a video apparatus, video signal detecting means, means for coupling said video signal detecting means to a video circuit of said video apparatus for receiving the video signal in said video apparatus, monitoring means coupled to said video signal detecting means for monitoring the video signal received by said video signal detecting means to provide an output voltage signal indicating absence of picture information in the video signal at least for a predetermined period of time during the interval between program material and commercial material, responsive means coupled between said control means and said monitoring means for responding to said output voltage signal to actuate said control means for controlling the audio output of said video apparatus, and automatic means responsive to video signals in said video apparatus for automatically adjusting sensitivity of the system.

16. A television editing system according to claim 1, wherein said video apparatus is a television receiver.

17. A television editing system according to claim 15 or 16, including timing means coupled to said responsive means for maintaining the actuation of said control means by said responsive means for a predetermined period of time.

18. A television editing system according to claim 15 or 16, wherein said control means is adapted to discontinue said audio output.

19. A television editing system in accordance with claim 15 or 16, wherein said control means is adapted to diminish said audio output.

20. A television editing system according to claim 15 or 16, wherein said control means is a relay having contacts in an audio circuit of said video apparatus.

21. A television editing system according to claim 15 or 16, wherein said monitoring means includes a control capacitor connected to an associated source of DC power and means for charging said capacitor with the video signal from said video signal detector means whereby the charge on said capacitor varies with the amplitude of the video signal, said responsive means being arranged to respond to the charge on said control capacitor corresponding to the absence of picture information in the video signal from said video signal detector means to actuate said control means.

22. A television editing system according to claim 21, wherein said automatic means for automatically adjusting sensitivity of the system includes means for adjusting the voltage level across said control capacitor to select automatically an output voltage signal level at which said responsive means will respond.

23. A television editing system according to claim 21, wherein said responsive means include a pair of control gates, means for connecting the input of one of said control gates to said monitoring means, means for connecting the output of said one control gate to the input of the other of said control gates, and means for connecting the output of said other control gate to said control means.

24. A television editing system according to claim 23, wherein said control gates comprises Schmitt trigger gates.

25. A television editing system according to claim 23, wherein said means for connecting the output of said one control gate to the input of said other control gate include a diode and wherein timing means are connected between said connecting means for said control gates and said associated source of DC power.

26. A television editing system according to claim 25, wherein said timing means comprises a resistor and a capacitor connected in parallel between said control gates connecting means and said associated source of DC power.

27. A television editing system according to claim 1 or 15, wherein said detecting means provides an output voltage signal indicating absence of picture information in the video signal for at least one frame.

* * * * *